United States Patent
Dreiseitel et al.

(10) Patent No.: US 10,338,269 B2
(45) Date of Patent: Jul. 2, 2019

(54) METHOD AND X-RAY INSPECTION SYSTEM, IN PARTICULAR FOR NON-DESTRUCTIVELY INSPECTING OBJECTS

(71) Applicant: Smiths Heimann GmbH, Wiesbaden (DE)

(72) Inventors: Pia Dreiseitel, Eschborn (DE); Sebastian König, Wiesbaden (DE); Andreas Mader, Trebur (DE); Dirk Naumann, Lorsch (DE); Jörg Nittikowski, Hohenstein-Holzhausen (DE)

( * ) Notice: Subject to any disclaimer, the term of this patent is extended or adjusted under 35 U.S.C. 154(b) by 118 days.

(21) Appl. No.: 15/111,740

(22) PCT Filed: Jan. 16, 2015

(86) PCT No.: PCT/EP2015/050773
§ 371 (c)(1),
(2) Date: Jul. 14, 2016

(87) PCT Pub. No.: WO2015/107150
PCT Pub. Date: Jul. 23, 2015

(65) Prior Publication Data
US 2016/0334535 A1 Nov. 17, 2016

(30) Foreign Application Priority Data
Jan. 16, 2014 (DE) .................. 10 2014 200 679

(51) Int. Cl.
*G06K 9/20* (2006.01)
*G06K 9/46* (2006.01)
*G01V 5/00* (2006.01)

(52) U.S. Cl.
CPC .................. *G01V 5/005* (2013.01)

(58) Field of Classification Search
CPC ............ G01V 5/005; G01V 5/0041; G06T 2207/30112; G06T 2207/10081; G01N 23/046
See application file for complete search history.

(56) References Cited

U.S. PATENT DOCUMENTS 5,065,418 A * 11/1991 Bermbach ............ G01V 5/0016
                                                   250/358.1
5,260,982 A * 11/1993 Fujii .................... G01V 5/0025
                                                   378/57

(Continued)

FOREIGN PATENT DOCUMENTS

DE      10149254 A1    5/2003
EP      1186909 A2     3/2002

(Continued)

OTHER PUBLICATIONS

International Search Report dated Sep. 2, 2015 for International Application No. PCT/EP2015/050773.

*Primary Examiner* — Brian Werner
(74) *Attorney, Agent, or Firm* — Kevin E. West; Advent, LLP (57) ABSTRACT

This disclosure relates to methods for non-destructively inspecting an object, wherein electromagnetic radiation is passed through the object and intensity values of unabsorbed beams are measured and evaluated. The method can include generating a three-dimensional data set in which a first material property of the object is associated with individual spatial elements of the object using computed tomography; determining an inspection space, in the three-dimensional data set; deriving values, based on the three-dimensional data set, corresponding to a spatial geometric quantity of the inspection space in a predetermined projection direction; generating a two-dimensional data set in which a second material property of the object is associated with individual (Continued)

surface elements of the object, using two-dimensional X-ray; determining an inspection region in the two-dimensional data set by computing a projection of the inspection space into the two-dimensional data set; and transferring the derived values into corresponding surface elements of the projection.

18 Claims, 5 Drawing Sheets

(56) References Cited

U.S. PATENT DOCUMENTS

| | | |
|---|---|---|
| 6,088,423 A | 7/2000 | Krug et al. |
| 7,023,957 B2 | 4/2006 | Bijjani et al. |
| 7,324,625 B2 | 1/2008 | Eilbert |
| 7,362,847 B2 | 4/2008 | Bijjani |
| 2005/0058242 A1 | 3/2005 | Peschmann |
| 2005/0180542 A1 | 8/2005 | Leue et al. |

FOREIGN PATENT DOCUMENTS

| | | |
|---|---|---|
| WO | 0042566 A1 | 7/2000 |
| WO | 2012110898 A2 | 8/2012 |

* cited by examiner

METHOD AND X-RAY INSPECTION SYSTEM, IN PARTICULAR FOR NON-DESTRUCTIVELY INSPECTING OBJECTS

TECHNICAL FIELD

The technical field of the disclosure relates in general to a method and an X-ray inspection system for the nondestructive inspection of objects. The disclosure relates in particular to a method and an X-ray inspection system with which information concerning the interior of an object, not visible from the outside, is determined by means of at least one rotating radiation source and at least one stationary radiation source.

BACKGROUND

Some X-ray inspection have multiple stationary X-ray radiation planes for inspecting objects. During operation, an object to be inspected is conveyed through multiple radiation planes, which in each case are emitted from an associated stationary radiation source. Intensities of unabsorbed X-rays from the respective radiation sources are measured using associated detector arrangements and subsequently evaluated, and at least one two-dimensional image of the interior of the object is created in order to determine a spatial area of the image for examination, based on a value of a material quantity which is determined from the intensity measurements.

Other X-ray inspection systems are of the computed tomography type, having a rotating gantry for inspecting objects. During operation, an object to be inspected is conveyed through multiple radiation planes, which in each case are emitted by radiation sources which are fastened to the gantry and which rotate about the object to be inspected. Intensities of unabsorbed radiation are measured and evaluated using a detector arrangement, which is likewise mounted on the gantry opposite from the radiation sources, in order to create a three-dimensional image of the interior of the object.

Some X-ray inspection systems successively irradiate an object to be inspected with X-rays from a stationary radiation source, and subsequently irradiate the object with X-rays from a radiation source which is fastened to a gantry and which rotates about the object to be inspected. Based on a generated two-dimensional high-resolution projection image and a low-resolution computed tomography image, a depiction of an article in the object, together with a display of the effective atomic number of the material thereof, is created.

Some inspection systems can identify an article within an enclosed object. To this end, the system has an acquisition subsystem including a computed tomography device and an alternate modality subsystem. The alternate modality includes a detector which is mounted on a rotatable gantry. The detector may be a quadrupole resonance unit, a dual energy X-ray unit, or a backscatter X-ray unit. The acquisition subsystem analyzes the object and distinguishes regions of interest, which may contain contraband, for example, from regions of no interest which likely contain no contraband. The article is then transported to the alternate modality subsystem, at which the detector further analyzes just the regions of interest. Similarly, in a preliminary stage, a standard X-ray scanner can be used to acquire preliminary information, and in a further stage the object can be analyzed with a computed tomography device, taking the preliminary information into account.

Likewise, some inspection systems can identify an article which poses a potential threat, and which is concealed in an object. To this end, the system has a first stage for rapidly identifying the position of the article in the object, and a second stage for accurately identifying the type of article. The first stage is an inspection system having at least two X-ray projection systems for generating a first data set. At least two images are generated based on the first data set. At least one target region in the object containing the article is determined from the images. The second stage is an additional check system having an inspection region which is positioned relative to the target region and which at least partially corresponds to the target region. The additional check system is used to generate a second data set from the inspection region, whose data are specific for the material in the inspection region.

Manufacturers of generic X-ray inspection systems for the automatic nondestructive inspection of objects continually strive to improve the follow-up inspection rate for the inspected objects at the same high detection rate, i.e., detection security level, with regard to the features of an object to be detected. It is can be of particular importance that an inspection system is able to inspect objects independently, i.e., largely without intervention by a human operator.

SUMMARY

One possible object of the present disclosure is to propose a method and a device for the nondestructive inspection of objects, in which the throughput of inspected objects at a predetermined detection security level is improved.

This object is achieved by the features of the method according to independent claim 1 and of the device according to claim 13. Further features and particulars of the herein proposed improvement result from the claims, the description, and the drawings. Features and particulars described in conjunction with the method according to the herein proposed improvement naturally also apply to the device according to the herein proposed improvement for the nondestructive inspection of an object, and vice versa, so that reciprocal reference is or may be made at all times with regard to the disclosure of the individual aspects of the herein proposed improvement.

A first aspect concerns methods for the nondestructive inspection of an object, wherein electromagnetic radiation is passed through the object and intensity values of unabsorbed beams are measured and evaluated, the method comprising the following steps: (i) generating a three-dimensional data set in which a first material quantity value corresponding to a first material property of the object is associated in each case with individual spatial elements of the object by means of a computed tomography method; (ii) determining an inspection space, in the three-dimensional data set representing the object, which has spatial elements whose first material quantity value is in a predetermined value range; (iii) deriving values, based on the three-dimensional data set, which in each case correspond to a spatial geometric quantity of the inspection space in a predetermined projection direction; (iv) generating a two-dimensional data set in which a second material quantity value corresponding to a second material property of the object is associated in each case with individual surface elements of the object, based on a surface projection of the object in the predetermined projection direction by means of a two-dimensional X-ray method; (v) determining an inspection region in the two-dimensional data set by computing a projection of the inspection space into the two-dimensional data set, corresponding to the predetermined projection direction; and (vi) transferring the derived values of the spatial geometric quantity into the two-dimensional data set, or associating the derived values in each case with corresponding surface elements of the projection.

"Generating the three-dimensional data set" means that in each case a first material quantity value for the particular spatial element is stored in a data set for spatial coordinates which represent individual spatial elements (voxels) of the object.

"Generating the two-dimensional data set" means that in each case a second material quantity value determined for the particular surface element is stored in a data set for spatial coordinates which represent individual surface elements of a two-dimensional projection of the object.

The values for the spatial geometric quantity of the inspection space determined by means of the computed tomography method may be evaluated together with the second material quantity values of the inspection region determined by means of the two-dimensional X-ray method in order to be able to assess more reliably and quickly whether the inspection space contains an object of a certain category.

The first material quantity value, which may be acquired using the computed tomography method, may be the local material density and/or the mass attenuation coefficient of the individual spatial element of the object.

The two-dimensional X-ray method may be a multi-energy X-ray method, by means of which the effective atomic number for the material of the object irradiated in the predetermined projection direction, corresponding to the individual surface elements, is determined in each case as the second material quantity value.

Based on the three-dimensional data set acquired using the computed tomography method, values which in each case correspond to the material thickness of the inspection space in the predetermined projection direction may be derived as the spatial geometric quantity. The inspection space acquired by means of the computed tomography method is made up of a plurality of spatial elements (voxels). The inspection space is projected onto a surface in the predetermined projection direction. For each surface element of this projection, a normal vector perpendicular to the surface element may be defined whose direction corresponds to the projection direction. Starting from each surface element, a straight line extending in the projection direction may thus be constructed which traverses the inspection space in the projection direction. The particular straight line segment extending in each case in the interior of the inspection space corresponds to the above-mentioned spatial geometric quantity, i.e., the material thickness of the inspection space in the area of the associated surface element.

According to a second aspect of the method, an instantaneous border of the projection, i.e., the instantaneous outer contour of the projection (instantaneous projection for short) of the inspection space in the two-dimensional data set, is corrected; i.e., a border correction is made. It is noted that this border may also correspond to a change in thickness of an examined article in the object. For example, an article in the object to be inspected could be composed of a material having steps made of this material. The stairstep borders are likewise a border within the meaning of the method discussed here. In other words, the method may be applied to actual borders which demarcate an article or region in the object to be inspected from its surroundings, and may similarly be applied to borders within an article or region.

A first border correction may constitute examining surface elements that form the instantaneous border of the projection. It is checked whether such a second material quantity value, which matches the first material quantity value from a predetermined value range, is associated in each case with the surface elements. That is, a plausibility check is made as to whether the value pair made up of the first and second material quantity values is physically consistent. If the examination establishes that this is not the case, such a surface element is removed from the instantaneous projection. That is, as a result, the instantaneous border of the projection is contracted inwardly, and the projection surface or the inspection region is diminished.

A second alternative or additional border correction may constitute examining surface elements that adjoin projection elements that form the instantaneous border of the projection. Once again, corresponding to the explained plausibility check, it is checked whether such a second material quantity value, which matches the first material quantity value from a predetermined value range, is associated with such a surface element. If the examination establishes that this is the case, such a surface element is added to the instantaneous projection. That is, as a result, the instantaneous border of the projection is pushed outwardly, and the projection surface or the inspection region is enlarged.

Projection elements correspond to the surface elements that are generated in the projection of the inspection space in the predetermined projection direction.

According to a third aspect, the method may include a further alternative or additional border correction. The instantaneous border of the projection is corrected based on an evaluation of local differences in the associated spatial geometric quantity in each case between adjacent surface elements. This procedure can be particularly suited for correcting borders within an article or region which result from a change in thickness in the examined article.

Starting from the projected border of the object to be examined, locally adjacent changes in the two-dimensional image may be searched, for example using a gradient filter, and assessed with regard to the similarity of the projected border, using various criteria. The respective partial assessments may be combined in a cost function by normalizing individual terms to the value range [0,1] and subsequently adding or multiplying them, or combining them via fuzzy operations. The individual terms may include one or more of the following: the absolute gradient values, the gradient values relative to the projected gradient, the local angle of the edges with respect to one another, and the spatial distance. In addition, the surroundings of the examined edge are assessed with regard to their noise characteristics. This combination then supplies the most probable corresponding border in the two-dimensional image in the immediate surroundings of the projected border.

According to a fourth aspect, data associated with the surface elements of the inspection region may be corrected, taking the reliability of the data or additional information into account. For this purpose, the first and second material quantity values as well as the values of the derived spatial geometric quantity for the individual surface elements of the projection are weighted, using a cost function. At least one of the following is used as parameter(s): the quality of the individual measurements, the noise level of the data, the material quantity values of material situated behind the inspection space in the predetermined projection direction, the material quantity values of material situated in front of the inspection space in the predetermined projection direction, the local homogeneity of the two-dimensional data set, a confidence value of the material determination, and the like. The individual parameters are preferably combined in normalized form. The combination may take place multiplicatively, additively, or according to rules of fuzzy logic, for example. This measure is used for stabilizing the locally determined material values, in particular in overlapping regions or for slight material changes.

According to a fifth aspect, a statistical analysis of the values of at least one of the following quantities may be performed: (i) the first material quantity values, iii) the second material quantity values, and (iii) the values of the derived spatial geometric quantity, such as the material thickness values for surface elements of the projection. For example, these values may be analyzed in each case by means of a histogram analysis, i.e., an evaluation based on a histogram formation. In each case the most probable value, for example the most frequent value, may be assigned to all surface elements of the projection. This measure can be advantageous when incorrect material values are present in areas, since due to the histogram formation, infrequent incorrect material values have hardly any influence. If the determined border elements are in fact all situated at the actual border of an article, in principle the material values should all be the same. The histogram analysis can be particularly tolerant with respect to individual errors, such as an overlap of various materials in the X-ray image. This measure can be particularly advantageous when one cannot be certain that all examined border regions are actually situated on the same article or its border.

According to a sixth aspect, the method may be designed in such a way that multiple surface projections of the inspection space are evaluated together for various projection directions and associated surface projections of the object. All surface projections may be included in the statistical analysis described above, whereby the individual contributions to the histograms of the particular projections may be combined into a single histogram of the article. This combination may once again be made in weighted or also unweighted form.

According to a seventh aspect, the inspection region may be classified based on the size of the inspection region and/or an average value of the first and/or second material quantity.

Lastly, it may be provided that a graphical depiction is made of the inspection region for a visual inspection by an operator, in the event that an unambiguous automatic classification of the inspection region is not possible.

A further aspect concerns a device for the nondestructive inspection of an object, in which electromagnetic radiation is passed through the object and intensities of unabsorbed beams are measured and evaluated. The device preferably has a data processing system which is operationally coupled to a first X-ray unit for acquiring the three-dimensional data set which represents the object, and which contains the spatial elements with which a first material quantity is associated in each case, and operationally coupled to at least one second X-ray unit for acquiring the two-dimensional data set containing the surface elements with which a second material quantity is associated in each case, the two-dimensional data set representing a surface projection of the object in the predetermined projection direction. The data processing system is preferably configured for carrying out a method according to one of the above aspects one through seven.

The device may also have a stationary portion, a radiation tunnel, and a transport device which leads through the radiation tunnel. The first X-ray unit may have a gantry that is supported on the stationary portion and rotatable about the radiation tunnel. At least one first radiation source for electromagnetic radiation in a plane of rotation, and an associated detector unit situated opposite from the first radiation source, may be fastened to the gantry. The at least one second X-ray unit may have at least one second radiation source for electromagnetic radiation, fixedly situated opposite from the radiation tunnel, and an associated fixedly situated second detector unit.

A further aspect is a computer program product with a computer program having software means for carrying out a method according to one of the aspects one through seven explained above, when the computer program is executed in an automation system. The automation system may be, for example, a control unit for the above-described device for the nondestructive inspection of an object.

Beams having a wavelength in the range of 10 nanometers to 10 picometers and frequencies of $2.5 \times 10^{17}$ Hz to $6 \times 10^{19}$ Hz, generally also referred to as X-rays, are suitable to be used as penetrating electromagnetic radiation. The radiation sources used for this purpose preferably emit X-rays in an energy range of up to 180 keV maximum. Systems in which X-rays are used for nondestructive irradiation are often referred to as X-ray test systems, X-ray inspection systems, or the like.

The method according to the herein proposed improvement and a device equipped with same, for example an X-ray inspection system, achieve a higher detection rate of inspected objects at the same high recognition rate with regard to the properties or features of an object of interest. The device is able to reliably inspect, analyze, and classify objects according to the objectives, largely without intervention by a human operator.

The methods according to the herein proposed improvement may basically be implemented by means of appropriate software programs in a data processing system in one computing unit, or distributed among multiple programmable computing units. The data processing system is then essentially configured, i.e., programmed, for carrying out the described method or portions thereof.

A computing unit may be designed, for example, in a known manner with one or more processors in the form of a computer system, i.e., equipped with the processor(s) as a central computing unit, and with internal memory and/or external memory which is configured in a non-volatile manner for the software and for operating data in the manner of a random access memory (RAM). The data processing system is connected via communication interfaces to a central control unit of the X-ray inspection system, for example, for interaction with functional components of the device.

Alternatively, the methods or individual method steps, which are time-critical, for example, may be implemented directly by means of appropriate digital electronic circuits, for example hard-wired logic modules or configurable logic modules. The latter may be implemented in a flexible manner by means of digital integrated circuits into which a desired logical circuit may be programmed.

For example, a programmable logic module, for example a programmable logic device (PLD) or a field-programmable gate array (FPGA), may be used for implementing one of the methods or certain portions or steps thereof. These types of flexibly programmable logic modules may be programmed using a specific configuration, i.e., with a configuration program or a configuration file. Unlike the programming of a computer using a computer program as an example of a computer implementation, in such an implementation the term "program" refers only secondarily to the specification of chronological sequences in the module, and refers primarily to a definition of its functional structure. Due to the programming of structural rules, the functionality of individual universal blocks of the logic module and their interwiring may be established, i.e., configured.

A complete implementation by means of a computer program, or also a complete implementation in hardware and any mixed form, is thus possible for carrying out one of the methods. Due to the high proportion of image processing in the method steps described above, individual or all steps may also be implemented for execution by hardware that is specialized for image processing, such as graphics processing units (GPUs), in an appropriate program instruction.

The herein proposed improvement can be particularly suited for X-ray inspection systems that are used at security screening locations in a baggage handling system, for example at airports, in order to automatically inspect luggage items and freight articles to be stowed onboard an aircraft, in a nondestructive manner, i.e., without opening them. The system may also be used at other control points, for example at entrances to security-relevant areas or buildings, at border inspection posts, etc., for inspection of objects such as handbags, or postal items such as letters, packages, and packets, carried by persons. The objective of such inspections may be to discover certain articles or materials, for example data carriers such as DVDs or CD-ROMs, or weapons, contraband, drugs, money, and the like, or also the detection of potentially hazardous materials and substances, such as explosives or chemicals. The detection of foods is also conceivable.

Another application of such X-ray inspection systems is nondestructive materials testing for detecting defects that are not externally visible, such as material weaknesses, fractures, cavities, inclusions, pores, shape deviations, or the like. A typical example is the inspection of machine elements such as turbine blades of modern jet engines. Another application is quality checking of weld seams. Use for quality assurance in complex electrical components is also possible, for example in order to check electrical components for completeness, correct installation of single parts, or defects such as cable breaks, defective connections, missing parts, incorrect location of parts, installation errors, breaks in spring parts, defective solder joints, or the like.

BRIEF DESCRIPTION OF THE DRAWINGS

Lastly, the X-ray inspection system may also be used for ensuring product safety for the detection of foreign bodies at various locations on a production line. One possible of such is the detection of glass fragments in foods.

BRIEF DESCRIPTION OF THE FIGURES OF THE DRAWING

Further advantages, features, and particulars of the herein proposed improvement result from the following description, in which exemplary embodiments of the herein proposed improvement are described in greater detail with reference to the drawings. The features mentioned in the claims and in the description may in each case be essential to the herein proposed improvement, alone or in any combination. Functionally equivalent or identical parts or components are sometimes provided with the same reference numerals. The terms "left," "right," "top," and "bottom" used in the description of the exemplary embodiments refer to the drawings in an orientation in which the figure numbers or reference numerals are normally readable.

DETAILED DESCRIPTION OF THE EXEMPLARY EMBODIMENTS

Numerous specific details are described in the following description. However, it is understood that further embodiments are also possible, without these specific details. In order to not unnecessarily complicate understanding of the present description, circuits, structures, and methods known to those skilled in the art are not addressed here in detail.

The terms "coupled" and "connected" and terms derived therefrom are not used synonymously here. Rather, in specific embodiments, "connected" may indicate that two or more elements are in direct physical or electrical contact with one another. "Coupled" may mean that two or more elements cooperate or mutually influence one another, whereby they may be in direct, or also indirect, physical or electrical contact with one another. Unless stated otherwise, use of the ordinal adjectives "first," "second," "third," etc., for denoting the same object merely indicates that reference is made to various examples of similar objects, and is not intended to imply that the objects thus denoted must appear in a certain chronological, spatial, ranked, or some other sequence.

Figure 1:
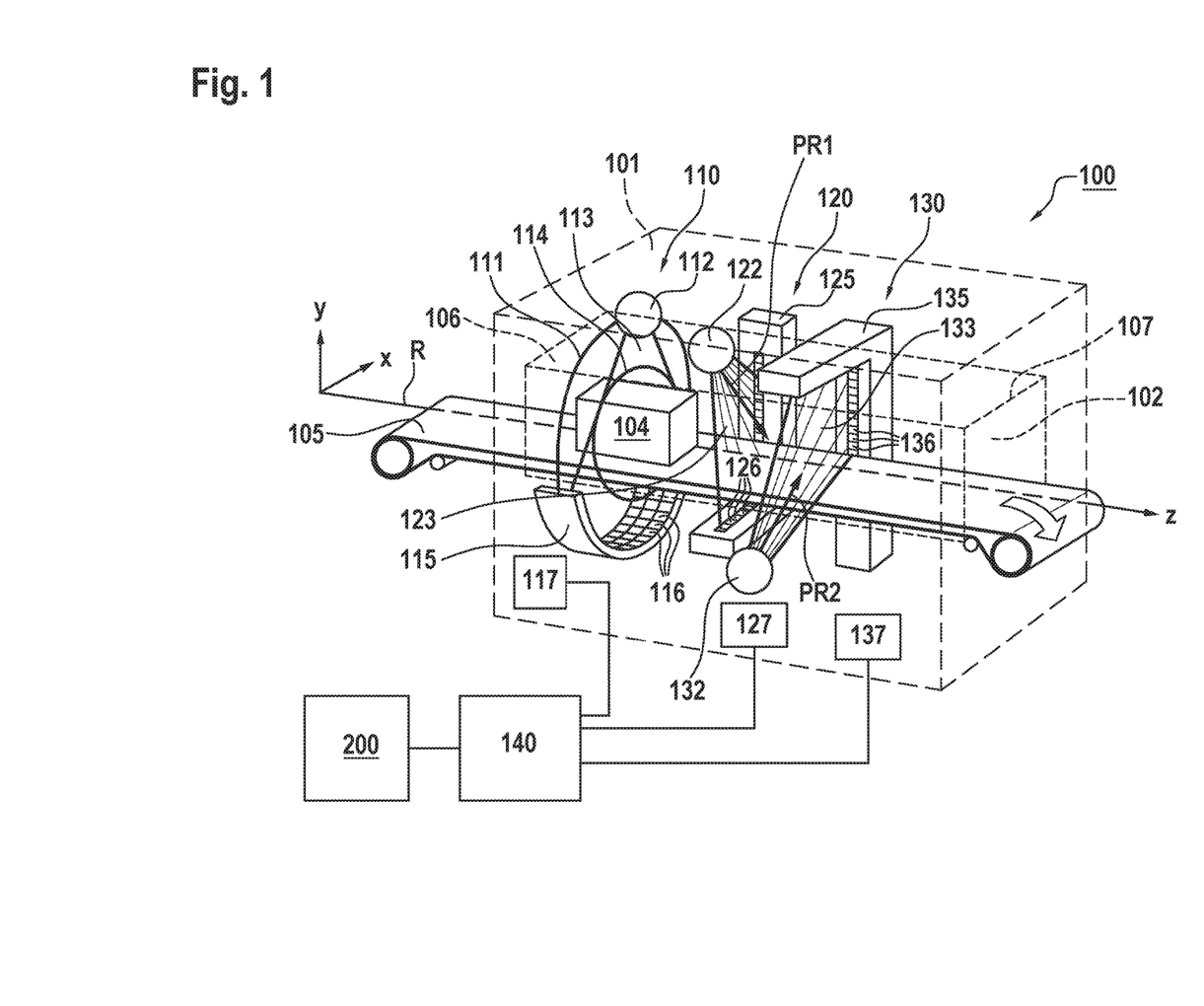
FIG. 1 schematically shows an X-ray inspection system according to the herein proposed improvement.

FIG. 1 schematically shows a system for inspecting objects (object to be inspected) by means of penetrating electromagnetic radiation in the form of X-rays.

The X-ray inspection system 100 in FIG. 1 has a stationary portion 101 and a radiation tunnel 102, having an essentially rectangular cross section, which passes essentially horizontally through the system. An object to be inspected 104, in the present example a suitcase, may be transported through the radiation tunnel 102 by means of a transport device 105, for example a conveyor belt, from an inlet 106 to an outlet 107.

For purposes of orientation, an xyz coordinate system is defined in FIG. 1. The z direction corresponds to the conveying direction of the transport device 105. The x direction extends transversely with respect to the conveying direction and in parallel to the conveying plane of the transport device 105. The y direction extends orthogonally with respect to both the z direction and the x direction, and in the normal setup of the X-ray inspection system 100 is perpendicular to the support surface.

Three X-ray units 110, 120, 130 are situated along the radiation tunnel 102. The first X-ray unit 110 is configured for acquiring a three-dimensional data set for the object to be inspected 104 by means of computed tomography. The X-ray unit 110 preferably determines a first material quantity value, which corresponds to the local material density or the local mass attenuation coefficient, for individual space or volume elements (voxels) as data elements of a three-dimensional data set for the object 104.

The two other X-ray units 120 and 130 are each configured for determining a two-dimensional data set, representing the object 104, by means of a preferably row-by-row X-ray projection of the object 104 for a predetermined projection direction PR1 and PR2, respectively. It is noted that instead of the two X-ray units (units 120 and 130 in the exemplary embodiment), only a single further X-ray unit may be provided, which is configured for generating multiple X-ray projections of the object 104 for various predetermined projection directions PR1 and PR2. This type of X-ray unit is known, for example, from DE 101 49 254 A1 by the present applicant.

In the exemplary embodiment, the second and third X-ray units 120 and 130 are in each case a multi-energy or a dual energy X-ray unit which is capable of determining, as a second material quantity value, the effective proton number (atomic number) of the irradiated material of the object 104 for each data element of the two-dimensional data set. The intensities of the X-rays acquired for individual data elements may be depicted as an image. The individual data elements then correspond to individual surface elements or pixels. For imaging, for example certain colors and brightness values may be associated with certain intensity values or associated value ranges.

For data acquisition in a section plane of the object 104, the first X-ray unit 110 has an essentially ring-shaped gantry 111 which is supported so as to be rotatable about a rotation axis R which extends essentially in the z direction. During operation, the gantry 111 rotates about an inspection region 114 that is situated in the radiation tunnel 102 and enclosed by the gantry. For rotation, the gantry 111 is driven by a motor (not shown) having a preferably constant but adjustable angular velocity. Fastened to the gantry 111 is a radiation source 112 which is rotatable about the inspection region 114 in such a way that the object 104 may thus be irradiated from all spatial directions in a plane of rotation defined by the gantry 111.

The radiation source 112 is an X-ray emitter, for example in the form of an X-ray tube having a stationary anode or rotating anode (for example, stationary anode tubes or rotary piston tubes). The radiation source 112 emits X-rays in an energy range of up to 180 keV maximum. The X-ray tube is situated in a housing (schematically indicated as a sphere in the figure).

To reduce the emission of radiation from the system, a collimator is typically provided which limits the ray beam 113 exiting from the radiation source 112 to a small exit angle in one plane (fan beam) or a cone (cone beam) having a small angular extension (divergence).

A conical ray beam thus has a continuous extension (divergence) that is different from zero in the plane perpendicular to the rotation axis R as well as in the direction of the rotation axis R, whereas a fan-shaped ray beam essentially has a continuous extension that is different from zero in the plane perpendicular to the rotation axis R, and has a relatively small extension in the direction of the rotation axis R. The ray beam 113 passes through the inspection region 114, and thus through the object to be inspected 104.

Additional peripheral devices and units, not illustrated here for simplicity, may optionally be situated on the gantry 111.

The inspection region 114 of the X-ray unit 110 is cylindrical, the longitudinal axis of the cylinder corresponding to the rotation axis R of the gantry 111, i.e., the z direction.

After passing through the inspection region 114 and the object to be inspected 104 which is conveyed through, due to the damping properties of the materials which are penetrated on the way through the object 104 the X-rays likewise strike the gantry 111 and the detector unit 115, which is situated opposite from the radiation source 112 and has a plurality of detector elements 116.

The detector elements 116 are arranged in detector rows and detector columns. A detector row is situated in a plane perpendicular to the rotation axis R, for example approximately on a circular arc around the radiation source 112; i.e., a detector row extends in the circumferential direction. The detector columns extend in parallel to the rotation axis R, i.e., in the z direction.

A detector element 116 may be a gas detector, a scintillation detector, or a semiconductor surface detector, for example, which is able to receive X-ray radiation and convert it into an electrical quantity (voltage, current) that corresponds to the intensity of the received radiation; suitable detector elements are known from EP 1 186 909 A2, for example.

In any rotational position of the radiation source 112, each detector element 116 may in each case supply a measured value for X-rays from the ray beam 113 striking the detector element 116. A measured value acquired by a given detector element 116 may thus be associated with each angular position of the radiation source 112 and stored.

The object to be inspected 104 is transported through the inspection region 114, in parallel to and in the direction of the rotation axis R, i.e., in the z direction, by means of the transport device 105, which is driven by a motor (not shown). The speed of advance is preferably constant and adjustable. When the motor driving the gantry 111 and the motor driving the transport device 105 are running at the same time, the detector elements 116 to be evaluated on the detector unit 115 are situated on a helix-shaped path relative to the object 104.

The X-ray unit 110 is monitored and controlled by a first control unit 117. The radiation source 112 and the detector unit 115 as well as other components rotating with the gantry 111 may be coupled to the control unit 117 via contactless slip rings, for example, not illustrated in greater detail. The control unit 117 is also connected to other sensors and actuators (not shown in FIG. 1) of the X-ray unit 110 via appropriate communication connections. For example, the control unit 117 also controls the motor rotating the gantry 111 to match the speed at which the transport device 105 is conveying the object 104.

The control unit 117 relays the acquired measured values of the detector unit 115, via a main control unit 140 of the X-ray inspection system 100 or directly, to a data processing system 200. At that location the individual measured values together with algorithms which are known for use in computed tomography are processed to form the three-dimensional data set of the object 104. Of course, it is also possible to provide the control unit 117 of the X-ray unit 110 or the main control unit 140 of the X-ray inspection system 100 with appropriate computing power so that the three-dimensional data set may already be generated there.

For the second or third X-ray unit 120 or 130, respectively, the object 104 is conveyed by the transport device 105 through X-rays emitted by at least one stationary radiation source 122 or 132, respectively. In the process, intensities of the beams of the particular radiation source 122 or 132 not absorbed by the object 104 are measured and evaluated in each case by means of at least one associated detector arrangement 125 or 135.

In the X-ray inspection system 100 in FIG. 1, as an exemplary embodiment the X-ray units 120, 130 contain a stationary radiation source 122 or 132, respectively, and an associated stationary detector arrangement 125 or 135, respectively, which measures the intensities of the X-rays that are not absorbed by the object 104. The radiation source 122 or 132 emits X-rays in an energy range of up to 140 keV maximum. The radiation sources 122 or 132 are each situated in such a way that the object 104 is irradiated at a predetermined projection direction PR1 or PR2, respectively, to obtain mutually independent intensity data. For this purpose, the radiation sources 122 and 132 are arranged at a distance from one another in the transport direction, i.e., the z direction, of the object 104, and on different sides of the radiation tunnel 102. For the second and third X-ray units 120, 130, respectively, X-rays are thus emitted in two, preferably fan-shaped, beam planes 123 or 133 for irradiation of the object 104, which is oriented toward the associated detector arrangement 125 or 135, respectively.

In the embodiment in FIG. 1, the beam plane 123 extends in parallel to the beam plane 133. In principle it is also possible, as disclosed in DE 101 49 254 A1, for example, to alternatively or additionally provide beam planes which are not parallel, i.e., which extend at an angle relative to one another. At least one beam plane preferably extends perpendicularly with respect to the transport direction, i.e., z direction, of the object 104.

The detector arrangements 125 and 135 each contain detector elements 126 and 136, respectively, arranged in a line which preferably has the shape of the letter "L," i.e., is L-shaped. In this way, all beams penetrating the object 104 may be detected with relatively small space requirements.

The detector arrangements 125, 135 preferably contain double detectors that are suitable for acquiring intensity values from at least two different energy ranges. For example, each detector element 126, 136 may be configured for detecting X-ray radiation from two subranges or two different energy ranges of the X-ray spectrum of the radiation sources 122, 132, and for supplying an associated measured value. Intensities of the X-rays absorbed by the object 104 are preferably measured separately for a high energy range and a low energy range. The two intensity values thus acquired allow a so-called multi-energy or dual energy evaluation. In addition to a probable density, the probable effective atomic number ($Z_{eff}$) of an irradiated material may be determined in this way. In practical terms, a detector element 126, 136 may be made up of two superposed separate individual detectors; such detector elements are known from above-cited EP 1 186 909 A2, for example.

The X-ray unit 120 or 130 is monitored and controlled by a second or third control unit 127 or 137, respectively, which is coupled to the respective radiation source 122 or 132 and the detector unit 125 or 135, and optionally to other peripheral devices and units by means of data connections, not illustrated in greater detail.

The second or third control unit 127 or 137, respectively, relays the acquired measured values of the detector unit 125 or 135, respectively, via the main control unit 140 or directly, to the data processing system 200. At that location the individual measured values together with algorithms which are known for this purpose are processed to form in each case a two-dimensional data set of the object 104 in the respective projection direction PR1 or PR2. Of course, here as well it is also possible, as already explained in conjunction with the first X-ray unit 110, to provide the control unit 127 or 137 of the X-ray unit 120 or 130, respectively, or the main control unit 140 of the X-ray inspection system 100 with appropriate computing power so that the particular two-dimensional data set may already be generated there.

Figure 2:
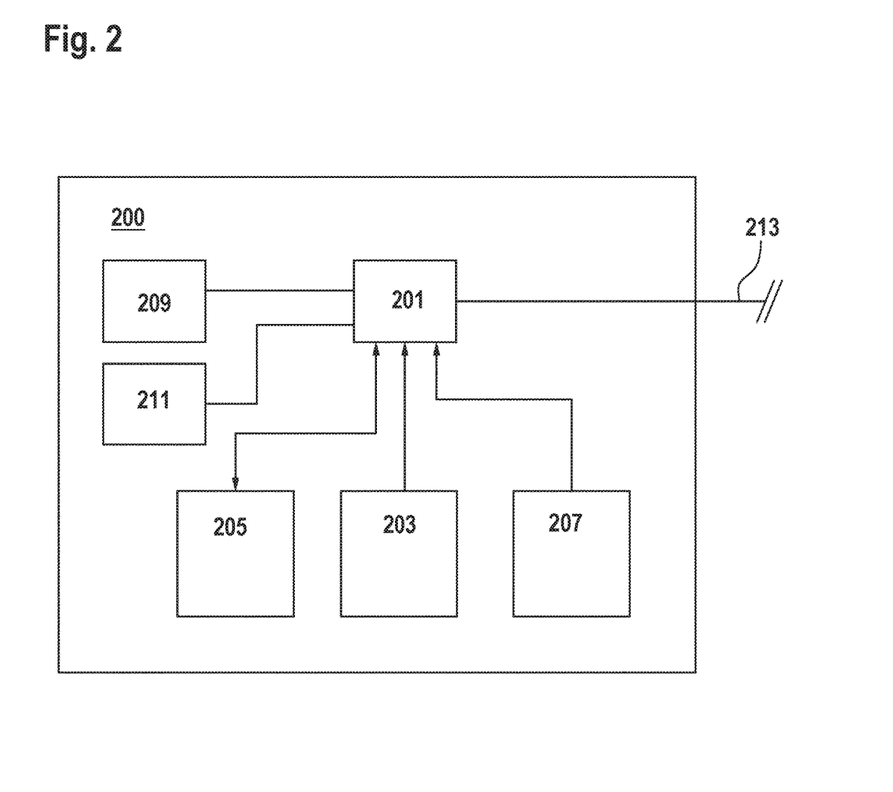
FIG. 2 schematically shows a block diagram of a data processing system for processing, according to the herein proposed improvement, of data concerning an object to be inspected, acquired in a three-dimensional data set and at least one two-dimensional data set.

FIG. 2 schematically shows one possible block diagram of the data processing system 200 for further processing and evaluation of the acquired data sets. It is understood that in principle, the data sets acquired by the X-ray units 110, 120, 130 may be processed in a data processing system 200 which is locally situated in or on the X-ray inspection system 100. However, it is also possible for the data processing system 200, coupled via a computer network, for example, to be situated at a central location in the manner of a mainframe computer system, in particular for the evaluation of the data sets of multiple X-ray inspection systems 100. It is also possible for the data processing system 200 to be formed by multiple computer systems which are connected to one another via a computer network, and thus spatially separate. Therefore, FIG. 2 essentially shows only the basic components of the data processing system 200 that are necessary for the implementation.

Thus, at least one processor 201 is provided for executing individual steps of the evaluation, proposed here, of the data sets for the object to be inspected 104 which are acquired by means of the X-ray units 110, 120, 130. Software means, for example a computer program for carrying out one of the methods explained below in the exemplary embodiment, are stored in at least one first memory 203 when the computer program is executed in the at least one processor 201. At least one second memory 205 is provided as main memory for the data sets to be processed and the intermediate and final results. A third memory may be provided, in which comparison values for specific material quantity values are stored in the form of a database; these may be, for example, specific variables of materials, in particular the density and/or the mass attenuation coefficient of these materials, known to influence the absorption of X-rays.

In addition, the data processing system 200 has input means 209, for example a keyboard, a touchpad, a pointer input unit (a computer mouse, for example), or the like, or a variant of one or a combination of these means which are tailored specifically for ease of use. An imaging output means, for example at least one screen or monitor, is provided for outputting messages or notifications, and for displaying individual articles contained in the object 104, or the interior of the object 104.

The data processing system 200 is coupled to the main control unit 140, or directly to the control units 117, 127, 137 via a data interface 213, and in this way may obtain the individual object-related data sets for further processing and analysis.

With regard to the data processing system 200, it is additionally noted that the term "processor" may refer to any given electronic device or circuit, or a portion of an electronic device or circuit, which processes electronic data from registers and/or a memory in order to convert electronic data into other electronic data or to use input data to generate appropriate output data which may be stored in registers and/or a memory. As already discussed, the data processing system 200 may include a processor 201 or multiple processors.

The data processing system 200 is preferably implemented as a combination of hardware, firmware, and software. Similarly, methods described here may be partially or completely implemented as software means which are stored on a machine-readable medium and which may be read in and executed for implementation in the data processing system 200. A machine-readable medium may be configured for any given mechanism for storing, transferring, or receiving information in a computer-readable form. Read-only memory (ROM), random access memory (RAM), magnetic storage disks, optical memory media, and flash memory media are listed here as non-exhaustive examples. Lastly, the software means may also be present in the form of a data stream as signals that are relayed optically, acoustically, or in some other manner (for example, as carrier waves, infrared signals, digital signals, etc.), and which may be transmitted via appropriate interfaces, for example antennas, which transmit and/or receive these signals.

A discussion is provided below, based on FIGS. 3a through 3f, concerning the manner in which, according to the first aspect, a three-dimensional data set acquired for an object to be inspected 104 having first material quantity values is used to determine an inspection space in the object 104 which is to undergo more detailed analysis, in order to subsequently project spatial geometric values of the inspection space, based on the first material quantity values, into a two-dimensional data set having second material quantity values for determining an inspection region.

An inspection space is determined, for example, in that a spatial region in the interior of the object 104 has a certain density and/or a certain mass attenuation coefficient. Such a spatial region, which is identified for a further inspection, may be determined, for example, in that material present at that location has a density in a range of 0.8 g/cm$^3$ to 1.9 g/cm$^3$. Explosives such as dynamite, gunpowder, liquid explosives (gels), and other substances such as trinitrotoluene (TNT) or components of plastic explosives or of types of explosives known as sheet explosives, for example nitropenta, hexogen, cellulose nitrate, or the like lie in this density value range. Another example of a density range of interest for other reasons is 0.8 g/cm$^3$ to 1.2 g/cm$^3$, corresponding to narcotics such as cocaine or heroin.

Figure 3A:
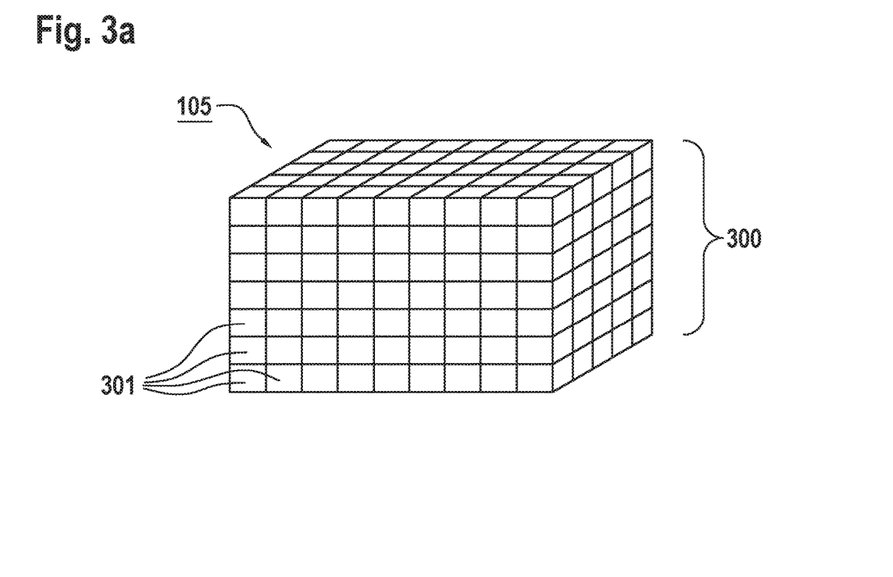
FIGS. 3a through 3f illustrate individual processing steps for data of the three-dimensional data set and the at least one two-dimensional data set.

FIG. 3a shows in a greatly simplified manner the object 104 as a cube which corresponds approximately to the suitcase in FIG. 1. A three-dimensional data set 300 having first material quantity values, representing the object 104, is generated by means of the X-ray inspection system 100 in FIG. 1, or more precisely, by the X-ray unit 110 situated therein, by use of a computed tomography (CT) method.

In principle, a first material quantity value corresponding to the local material density and/or the local mass attenuation coefficient is determined for the object 104, according to the system-related resolving power of the X-ray unit 110, by means of known two- and/or three-dimensional reconstruction processes, for a plurality of individual isotropic spatial elements or volume elements (voxels) 301 of the object 104. For purposes of illustration, the object 104 is divided into isotropic voxels 301 of equal size in FIG. 3a; it is understood that in an actual implementation, the resolution is dimensionally higher, and consequently an individual voxel 301 is dimensionally smaller, for example having edge lengths of 100 to 10 microns.

Depending on the application scenario of the X-ray inspection system 100, value ranges are preset for certain material density values and/or mass attenuation coefficient values, so that in principle, spatial regions in the interior of the object 104 that are of interest for more detailed analysis with regard to the inspection objective may be recognized, marked, or selected.

That is, an inspection space in the object 104 is preselected during the determination of the three-dimensional data set by means of a CT process. In other words, as the result of selecting or marking an inspection space (or possibly multiple inspection spaces) during the CT process, the extent of voxels 301 of the three-dimensional data set 300 to be further processed by the data processing system 200 is greatly reduced. This results in an overall quicker system response, and less computing power is required.

In the present exemplary embodiment, the inspection space 310 (FIG. 3b) in the three-dimensional data set 300 representing the object 104 is determined by selecting or marking those voxels 311 with which in each case a first material quantity value from a predetermined value range corresponding to the local material density of the object 104 is associated.

Figure 3B:
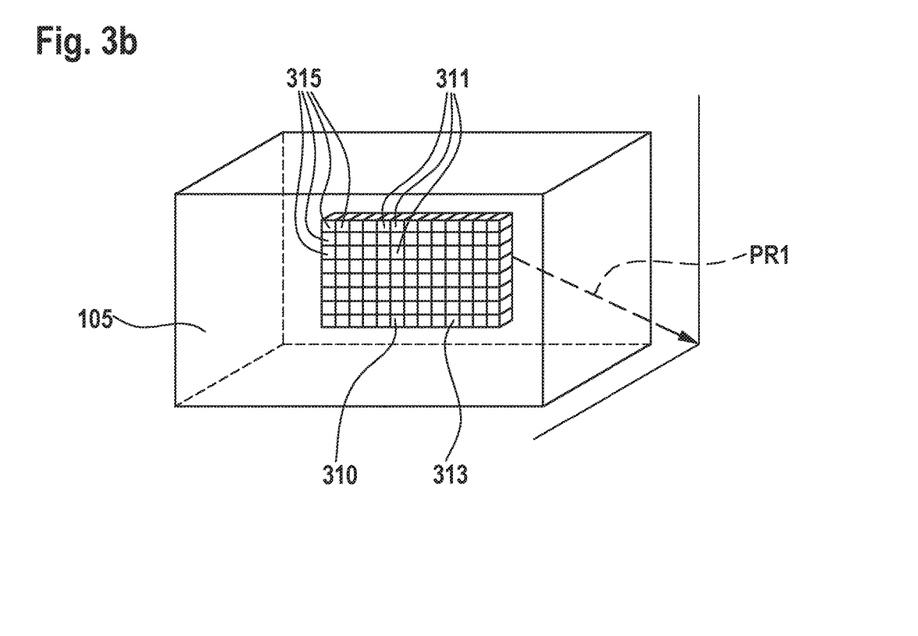

FIG. 3b illustrates the inspection space 310 for the case of a plate-shaped article for whose voxels 311 a material density in the range of 1.6 g/cm$^3$ to 1.7 g/cm$^3$ has been determined. The inspection space 310 could be a sheet explosive, for example.

Figure 3C:
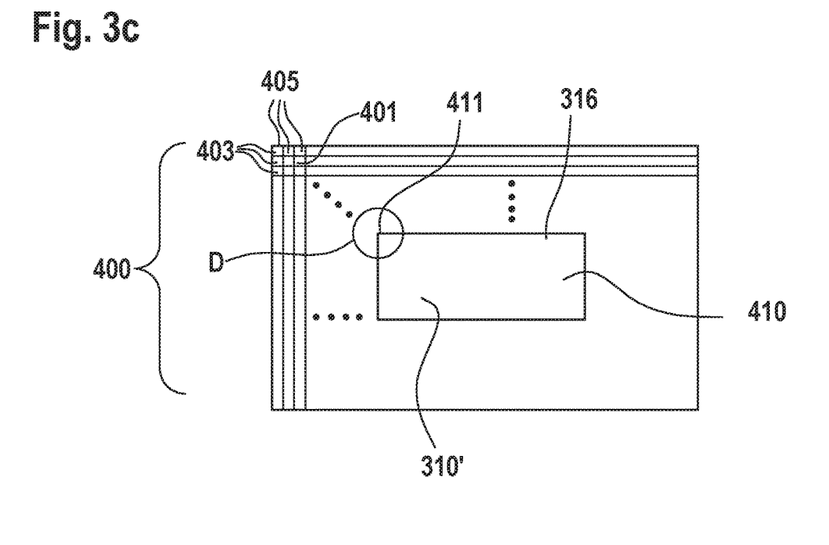

FIG. 3c illustrates a two-dimensional data set 400 in which, based on a surface projection of the object 104, for example using the X-ray unit 120 or 130 in a predetermined projection direction PR1 or PR2 (see FIG. 3b), in each case a second material quantity value, corresponding, for example, to the effective atomic number $Z_{eff}$, has been associated with each individual surface element 401.

The two-dimensional data set 400 is generated using the X-ray unit 120 or 130, in that intensity values of the two-dimensional data set for the object 104, measured row by row by means of the detector unit 125 or 135, are created, and stored in the data processing system 200 for further processing. Data elements of the two-dimensional data set 400 correspond to surface elements 401 with which the given second material quantity value is associated in each case.

The second material quantity value is determined by means of intensity values measured by the detectors 126 and 136. In the exemplary embodiment, for this purpose the value of the effective atomic number $Z_{eff}$ of the material irradiated at this location is determined for each surface element 401. This is determined in each case, by means of a known multi-energy or dual energy method, from two intensity values that are measured for each surface element 401, in each case for a high energy range and a low energy range of the X-rays 123 and 133.

FIG. 3c illustrates the two-dimensional data set 400 as a surface projection image of the object 104. Similarly, the determined second material quantity values could be depicted on a screen, for example, by means of associated gray scale values or color values.

The inspection space 310 has been projected into the two-dimensional data set 400 in FIG. 3c, corresponding to projection direction PR1, for example (FIG. 3b), in order to determine an inspection region 410 corresponding to the inspection space 310. In the exemplary embodiment, the border 316 of the projection 310' of the inspection space 310 is based on the voxels 315 situated on the border of the projection 310' of the inspection space 310 (see FIG. 3b).

An article whose material has material density values which have been determined using the X-ray unit 110, and which according to the selected example could possibly be a sheet explosive, may be situated in the inspection region 410 which is selected or marked by means of the projection 310'. The projection 310' is a depiction of the inspection space 310 from the three-dimensional data set 300 in the two-dimensional data set 400, and marks the inspection region 410 to be further analyzed. By means of the projection 310', surface elements 401 of the two-dimensional data set 400 are thus selected or determined for further inspection.

The surface elements 401 selected in this manner, which determine the inspection region 410, may be marked, for example, by an appropriate association or transfer of the first material quantity values of the projected voxels to the corresponding surface elements.

According to another aspect, in the projection of the inspection space 310, values are derived which correspond in each case to a spatial geometric quantity, for example the material thickness of the inspection space 310, in the associated predetermined projection direction PR1 or PR2. The inspection space 310 acquired by means of the computed tomography method is made up of a plurality of spatial elements (voxels). The inspection space 310 is projected onto a surface in the predetermined projection direction PR1 or PR2. This results in a projection 310' in each case. For each surface element of the projection 310', a normal vector which is perpendicular to the surface element may be defined whose direction corresponds to the projection direction PR1 or PR2. Starting from each surface element, a straight line extending in the projection direction PR1 or PR2 may thus be constructed which traverses the inspection space 310 in the projection direction PR1 or PR2. The particular straight line segment, which in each case extends in the interior of the inspection space 310, corresponds to the above-mentioned spatial geometric quantity, i.e., the material thickness of the inspection space 310 in the area of the associated surface element.

As already discussed, the second material quantity value, in this case the value for $Z_{eff}$, has been associated in each case with all surface elements 401 of the two-dimensional data set 400. As a result of the projection 310' which selects or marks the inspection region, the first material quantity value and the derived spatial geometric quantity have been associated with or transferred to the surface elements belonging to the inspection region 410. That is, a first material quantity value, a second material quantity value, and a spatial geometric quantity derived on the basis of the first material quantity value and the projection direction have thus been associated with each data element of the inspection region 410 of the two-dimensional data set 400. With knowledge of this information concerning the inspection region 410, a determination of the actual material present in the inspection region 410, i.e., a classification of the inspection region, may take place.

The spatial resolution of the first, three-dimensional data set 300 is different from, in particular usually lower, than the resolution of the second, two-dimensional data set 400. Thus, the projection 310' of the inspection space 310 does not encompass just those surface elements which actually belong to the inspection region 410. It is also possible that surface elements associated with the inspection region 410 are not encompassed. The result essentially is that the border 316 of the projection 310' of the inspection space 310 does not always exactly match the actual border 416 of the inspection region 410.

Technical variations of the X-ray units 110, 120, and 130 may be another reason for the discrepancy between the borders 316 and 416. This may also be caused by faulty segmentation of the article in the three-dimensional data set; this may be the result, for example, of a clump of a material that is sought, i.e., to be detected, being covered by a plate-shaped metal. Another reason may be that the X-rays emanate from the punctiform radiation source 112 in the CT X-ray unit 110, so that the beam fan 113 correspondingly diverges, resulting in detection resolution in the inspection region 114 which differs locally. The above-described deviation of the borders is illustrated in a simplified manner in FIG. 3*d*, based on detail D from FIG. 3*c*. The surface element 411, which forms the upper left corner of the actual inspection region, is marked as a reference point in FIGS. 3*c* through 3*f*.

Figure 3D:
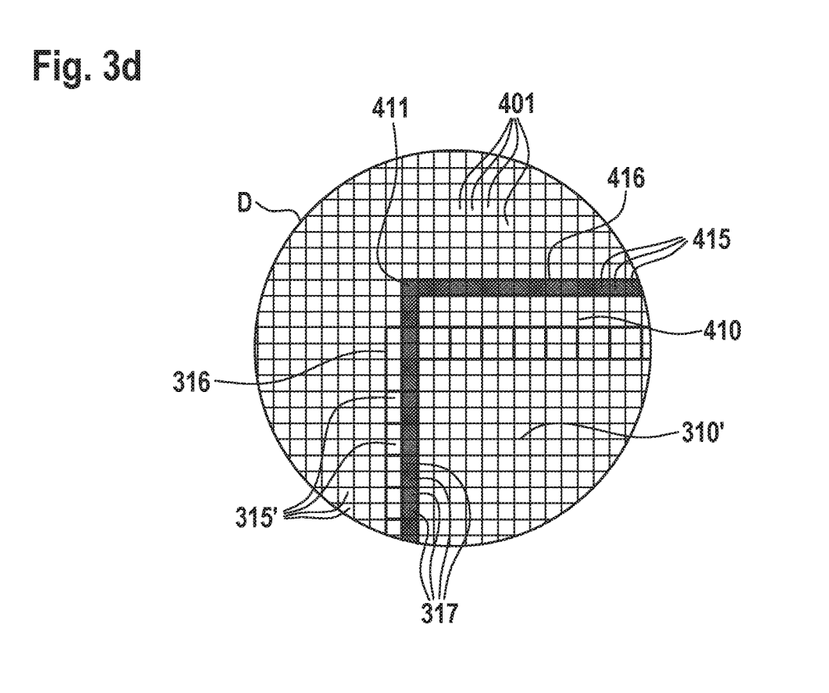

For a simpler illustration, for the exemplary embodiment it has been assumed that the resolution of the projection 310' of the inspection space 310 is approximately half the resolution of the two-dimensional data set 400. In the exemplary embodiment, projection elements 315' are therefore illustrated as squares which are twice as large as the surface elements 401 of the two-dimensional data set 400. The elements 315' approximately correspond to the result of the projection of a particular voxel 315 into the two-dimensional data set 400, situated at the border of the inspection space 310; this is an oversimplification which is assumed for a simpler illustration, and which clarifies the principles described here to those skilled in the art and does not hinder the actual implementation.

FIG. 3*d* shows the border 316 of the projection 310', which is formed by the projection elements 315'. Also shown is a border 416 that is formed from surface elements 415 filled in black. The surface elements 415 are those surface elements which all essentially have a certain value of the second material quantity—according to the exemplary embodiment, which have approximately the same value for the effective atomic number $Z_{eff}$—and which form the actual or correct border of the inspection region 410.

According to a second aspect, the data processing system 200 corrects the border 316 of the projection 310' in such a way that the projection 310' ultimately matches the actual inspection region 410.

In a first border correction procedure, all of the projection elements 315' which form the border 316 of the projection 310' are checked as to whether their associated surface elements 401 belong to the actual inspection region 410. This is checked by means of a physical plausibility condition. For this purpose, it is checked whether a second material quantity value, which matches the first material quantity value of the inspection space 310, is assigned to an associated surface element 401. In the present example, for example a $Z_{eff}$ value in the range of 6.5 to 7.5 with regard to the above-mentioned material density in the range of 1.6 g/cm³ to 1.7 g/cm³ would be plausible. If this is not the case, for example for the surface elements 317, these surface elements are regarded as not belonging to the inspection region 410. That is, such a surface element 317 is to be removed from the projection 310'.

For example, for such surface elements 317 in the two-dimensional data set 400, already associated first material quantity values or the at least one spatial geometric quantity derived therefrom are/is deleted.

The first border correction procedure is repeated until no surface element 317 remains which belongs to a projection element 315' that forms the instantaneous border 316 of the projection 310', and with which a second material quantity value is associated which does not match the first material quantity value of the inspection space 310.

As a result, the first border correction procedure corrects the border of the projection 310' with regard to the actual inspection region 410, from the outside to the inside. That is, the border of the projection 310' is contracted until it coincides with the border 416 of the actual inspection region 410.

Figure 3E:
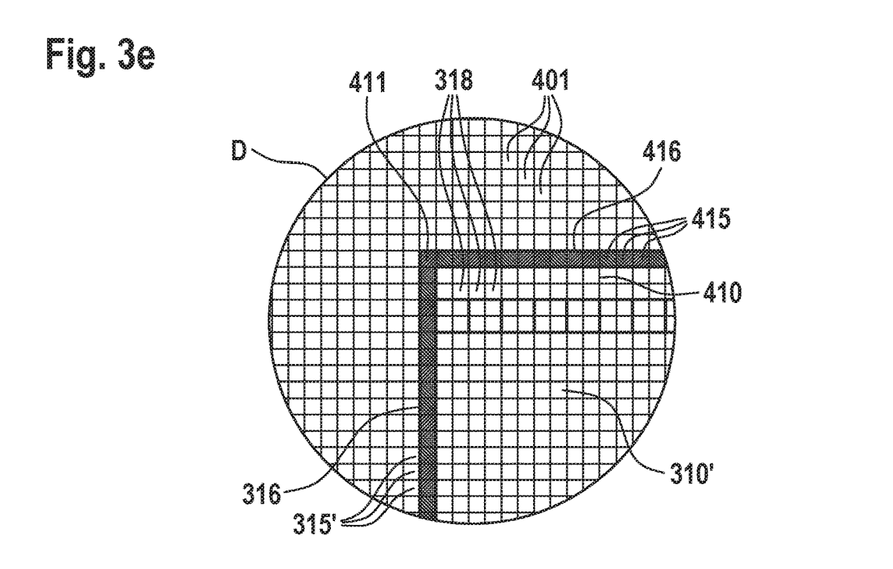

FIG. 3*e* shows the result of the first correction procedure. All surface elements 317 of projection elements 315' which were situated outside the actual inspection region 410 have been deleted. Thus, the border 316 of the projection 310' onto the actual border of the inspection region 410 determined by the second material quantity is corrected.

In a second correction procedure, the data processing system 200 now corrects the border 316 of the projection 310' by once again checking surface elements 418 adjoining projection elements 315' which are situated on the border outside the projection 310' or which form the border, with regard to the above-mentioned physical plausibility condition. That is, it is checked whether a second material quantity value that matches the first material quantity value is associated with the surface elements 418. If this is the case, such a surface element 418 is regarded as belonging to the inspection region 410. That is, such a surface element 418 is to be added to the projection 310'.

As a result, the second border correction procedure corrects the border of the projection 310' with regard to the actual inspection region 410, from the inside to the outside. That is, the border of the projection 310' is expanded until it coincides with the border 416 of the actual inspection region 410.

For example, a corresponding first material quantity value or the at least one spatial geometric quantity derived therefrom may be associated with such surface elements 418 in the two-dimensional data set 400.

The second correction procedure is repeated until no more surface elements 418 can be found, i.e., until a surface element which adjoins the projection element 315' that forms the instantaneous border 316 of the projection 310', adjacent to the projection 310' from the outside, can no longer be found with which a second material quantity value, which matches the first material quantity value of the inspection space 310, is associated.

As a result, with the second correction, the border 316 of the projection 310' has been expanded to the actual border 416 of the actual inspection region 410 determined by the second material quantity.

It is noted that the sequence in which the first and second correction procedures are carried out is arbitrary. However, the correction procedures may be carried out concurrently or in parallel.

Figure 3F:
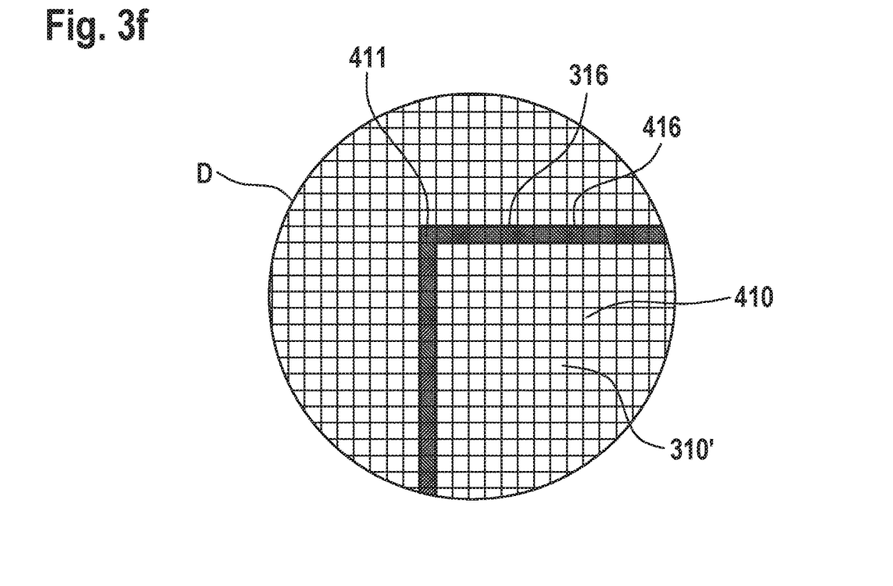

FIG. 3f shows the result of the second correction procedure. The border 316 of the projection 310' now matches the border 416 of the actual inspection region 410. Consequently, the corrected projection 310' corresponds to the actual inspection region 410.

According to another aspect, borders of the inspection region 410 may alternatively or additionally be corrected by the data processing system 200 by evaluating differences in the local material thickness between adjacent surface elements.

For this purpose, the spatial geometric quantities derived from the first material quantity values in the first data set 300 by means of the projection 310' may be evaluated. As discussed above, the derived spatial geometric quantity may be the particular material thickness of the inspection space 310 in the projection direction PR1 or PR2. This particular material thickness value together with the particular projection elements 315' has been transferred to surface elements in the projection 310'.

As a result, the inspection region may be corrected with a third correction procedure in which the material thickness values of adjacent surface elements of the inspection region 410 are compared to one another. This ensures that the examined change in the image is actually a border or a change in thickness on the examined article. The most probable edge element is used in each case for the further processing.

According to another aspect, the corrected inspection region 410 is analyzed to draw a conclusion concerning the material that is actually present therein; i.e., depending on the exemplary embodiment, to rule out with the desired level of safety that a suspected potentially hazardous material is present, or to initiate further inspection of the object 104 by a human operator.

To draw a conclusion concerning the actual material in the inspection region, the first material quantity values and the second material quantity values, and optionally the derived material thickness values, may be weighted, using a cost function. One or more of the following parameters may be used as parameters for determining the weightings: the quality of the individual measurements, the noise level of the data, material quantity values of material situated behind the inspection region 410 in the predetermined projection direction PR1 or PR2, material quantity values of material situated in front of the inspection region 410 in the predetermined projection direction PR1 or PR2, or the local homogeneity of the two-dimensional data set.

The overall quality $Q_{overall}$ may also be implemented as a weighted sum or as a fuzzy overall assessment of individual quality values $a_i Q_i$ for $0<i<1$, i.e., $$Q_{overall} = \Pi_0^i a_i Q_i.$$

According to another aspect, the data processing system 200 statistically evaluates at least one of the following quantities: (i) the first material quantity values, (ii) the second material quantity values, and (iii) the material thickness values in the corrected inspection region 410.

The particular values are analyzed in each case by means of a histogram illustration, and in each case the most frequent value of all surface elements 401 in the inspection region 410 is assigned to all surface elements 401 in the inspection region 410. This can be advantageous in particular when not all examined border regions actually lie on the same article or its border. If incorrect borders are contained in the evaluation, due to the histogram formation they cause less interference in the evaluation than for a direct mean value formation. The histogram analysis can be particularly tolerant here with respect to individual errors (for example, overlap by other materials).

As already discussed (see FIG. 1), the inspection system 100 is configured for generating more than one two-dimensional data set 400 for different projection directions PR1, PR2. Accordingly, for any projection from the three-dimensional data set 300 for the inspection space 310, values may be derived which correspond to the particular local material thicknesses of the inspection space 310. Correspondingly, multiple surface projections may be evaluated together for determining the material in the inspection region. Thus, any surface projection may be part of the statistical analysis.

To draw a conclusion concerning the material that is actually present in the inspection region 410, the inspection region 410 is classified based on the size of the inspection region 410, the average value of the first material quantity values, and the second material quantity value assigned to the inspection region 410. For this purpose, the material quantity values are compared to the expected values for known materials. If they are contained in a predefined interval around the target value, a conclusion is drawn concerning the material value. Similarly, the alarm/no alarm decision is made by the system or the method.

For the case that the data processing system 200 cannot rule out with the preset level of safety that potentially hazardous materials are present in the inspection region, a graphical depiction of the inspection region 410 may be made on an output means of the data processing system 200 for a visual inspection by an operator. If a conclusive assessment of the inspection region 410 is likewise not possible by means of the visual inspection, the data processing system 200 may recommend or initiate a manual inspection.

The invention claimed is:

1. A method for the nondestructive inspection of an object, wherein electromagnetic radiation is passed through the object and intensity values of unabsorbed beams are measured and evaluated, the method comprising the following steps:
   generating a three-dimensional data set in which a first material quantity value corresponding to a first material property of the object is associated in each case with individual spatial elements of the object by means of a computed tomography method employing a first X-ray unit including at least one first radiation source and an associated first generally L-shaped detector unit;
   determining an inspection space, in the three-dimensional data set representing the object, which has spatial elements whose first material quantity value is in a predetermined value range;
   deriving values, based on the three-dimensional data set, which in each case correspond to a spatial geometric quantity of the inspection space in a predetermined projection direction;
   generating a two-dimensional data set in which a second material quantity value corresponding to a second material property of the object is associated in each case with individual surface elements of the object, based on a surface projection of the object in the predetermined projection direction by means of a two-dimensional X-ray method employing at least one second X-ray unit with at least one second radiation source and an associated second generally L-shaped detector unit, the second detector unit including a first detection portion in a first plane and a second detection portion in a second plane, the first plane being distinct from the second plane, the generally second L-shaped detector unit being arranged in a different direction than the first generally L-shaped detector unit;
   determining an inspection area in the two-dimensional data set by computing a projection of the inspection space into the two-dimensional data set, corresponding to the predetermined projection direction; and
   transferring the derived values of the spatial geometric quantity into corresponding surface elements of the projection.

2. The method according to claim 1, wherein the first material quantity value is the local material density and/or the mass attenuation coefficient of the individual spatial element of the object.

3. The method according to claim 1, wherein the two-dimensional X-ray method is a multi-energy X-ray method, by means of which the effective atomic number for the material of the object irradiated in the predetermined projection direction, corresponding to the individual surface elements, is determined in each case as the second material quantity value.

4. The method according to claim 1, wherein the method further comprises deriving values, which in each case correspond to a material thickness of the inspection space in the predetermined projection direction, as the spatial geometric quantity.

5. The method according to claim 1, wherein the method further comprises correcting an instantaneous border projection in the two-dimensional data set by at least one of:
   checking surface elements, which are determined by the projection elements that form the border, as to whether such a second material quantity value, which matches the first material quantity value from the predetermined value range, is associated in each case with the surface elements, and if this is not the case, removing such surface elements from the projection; or
   checking surface elements, which adjoin projection elements that form the instantaneous border, as to whether such a second material quantity value, which matches the first material quantity value from the predetermined value range, is associated in each case with the surface elements, and if this is the case, adding such surface elements to the projection.

6. The method according to claim 1, wherein the method further comprises correcting the borders of at least one of the projection or of the inspection region by evaluating local differences in the associated spatial geometric quantity in each case between adjacent surface elements.

7. The method according to claim 1, wherein the method further comprises weighting the first material quantity values, the second material quantity values, and the values of the derived spatial geometric quantity for surface elements of the projection, using a cost function which utilizes at least one of the following as a parameter: quality of the individual measurements, noise level of the data, material quantity values of material situated behind the inspection space in the predetermined projection direction, material quantity values of material situated in front of the inspection space in the predetermined projection direction, or local homogeneity of the two-dimensional data set.

8. The method according to claim 1, wherein the method further comprises statistically analyzing at least one of the first material quantity values, the second material quantity values, and the values of the spatial geometric quantity for surface elements of the projection, wherein the values are analyzed, and in each case the most frequent value is assigned to all surface elements of the projection.

9. The method according to claim 1, wherein all surface projections are evaluated together in such a way that all surface projections are part of a statistical analysis of the two-dimensional data set.

10. The method according to claim 1, wherein the method further comprises classifying the inspection region based on at least one of the following: a size of the inspection region, an average value of the first material quantity values, and a value of the second material quantity assigned to the inspection region.

11. The method according to claim 1, wherein the method further comprises displaying a graphical depiction of the inspection region for a visual inspection.

12. A device for the nondestructive inspection of an object, in which electromagnetic radiation is passed through the object and intensities of unabsorbed beams are measured and evaluated, the device comprising:
   a data processing system which is operationally coupled to the first X-ray unit for acquiring a three-dimensional data set which represents the object, containing spatial elements with which a first material quantity, which corresponds to the local material density of the object, is associated in each case, and operationally coupled to the at least one second X-ray unit for acquiring a two-dimensional data set containing surface elements with which a second material quantity which corresponds to an effective atomic number of irradiated material is associated in each case, wherein the two-dimensional data set represents a surface projection of the object in a predetermined projection direction, and the data processing system is configured for carrying out a method according to claim 1.

13. The device according to claim 12, further comprising:
a stationary portion;
a radiation tunnel;
a transport device which leads through the radiation tunnel;
the first X-ray unit including a gantry that is supported on the stationary portion and rotatable about the radiation tunnel, and to which the at least one first radiation source for electromagnetic radiation in a plane of rotation and the associated first generally L-shaped detector unit situated opposite from the at least one first radiation source are fastened; and
the at least one second radiation source configured for generating electromagnetic radiation, the at least one second radiation source fixedly situated opposite from the radiation tunnel and fixedly situated relative to the associated second generally L-shaped detector unit.

14. A non-transitory computer program product with a computer program having software means for carrying out a method according to claim 1, wherein the computer program is configured to be executed in an automation system.

15. The device according to claim 12, further comprising a non-transitory computer program product, wherein the computer program product is configured to be executed in an automation system, the automation system being a control unit for the device according to claim 12.

16. The method according to claim 1, wherein the first detection portion and the second detection portion together define the second generally L-shaped unit.

17. A method for the nondestructive inspection of an object, wherein electromagnetic radiation is passed through the object and intensity values of unabsorbed beams are measured and evaluated, the method comprising the following steps:
generating a three-dimensional data set in which a first material quantity value corresponding to a first material property of the object is associated in each case with individual spatial elements of the object by means of a computed tomography method employing a first X-ray unit including at least one first radiation source and an associated first detector unit;
determining an inspection space, in the three-dimensional data set representing the object, which has spatial elements whose first material quantity value is in a predetermined value range;
deriving values, based on the three-dimensional data set, which in each case correspond to a spatial geometric quantity of the inspection space in a predetermined projection direction;
generating a two-dimensional data set in which a second material quantity value corresponding to a second material property of the object is associated in each case with individual surface elements of the object, based on a surface projection of the object in the predetermined projection direction by means of a two-dimensional X-ray method employing at least one second X-ray unit with at least one second radiation source and an associated second detector unit, the second detector unit including a first detection portion in a first plane and a second detection portion in a second plane, the first plane being distinct from the second plane;
determining an inspection area in the two-dimensional data set by computing a projection of the inspection space into the two-dimensional data set, corresponding to the predetermined projection direction;
transferring the derived values of the spatial geometric quantity into corresponding surface elements of the projection; and
statistically analyzing at least one of the first material quantity values, the second material quantity values, and the values of the spatial geometric quantity for the surface elements of the projection, wherein the values are analyzed, and in each case the most frequent value is assigned to all surface elements of the projection, wherein the values are analyzed based on a histogram analysis.

18. A method for the nondestructive inspection of an object, wherein electromagnetic radiation is passed through the object and intensity values of unabsorbed beams are measured and evaluated, the method comprising the following steps:
generating a three-dimensional data set in which a first material quantity value corresponding to a first material property of the object is associated in each case with individual spatial elements of the object by means of a computed tomography method;
determining an inspection space, in the three-dimensional data set representing the object, which has spatial elements whose first material quantity value is in a predetermined value range;
deriving values, based on the three-dimensional data set, which in each case correspond to a spatial geometric quantity of the inspection space in a predetermined projection direction;
generating a two-dimensional data set in which a second material quantity value corresponding to a second material property of the object is associated in each case with individual surface elements of the object, based on a surface projection of the object in the predetermined projection direction by means of a two-dimensional X-ray method;
determining an inspection area in the two-dimensional data set by computing a projection of the inspection space into the two-dimensional data set, corresponding to the predetermined projection direction;
transferring the derived values of the spatial geometric quantity into corresponding surface elements of the projection; and
weighting the first material quantity values, the second material quantity values, and the values of the derived spatial geometric quantity for surface elements of the projection, using a cost function which utilizes at least one of the following as a parameter: quality of the individual measurements, noise level of the data, material quantity values of material situated behind the inspection space in the predetermined projection direction, material quantity values of material situated in front of the inspection space in the predetermined projection direction, or local homogeneity of the two-dimensional data set.

* * * * *